United States Patent
Williams et al.

(10) Patent No.: US 6,256,780 B1
(45) Date of Patent: Jul. 3, 2001

(54) METHOD AND SYSTEM FOR ASSEMBLING SOFTWARE COMPONENTS

(75) Inventors: Antony S. Williams, Mercer Island; Walter L. Hill; Mark B. Grossman, both of Kirkland; Crispin Goswell, Redmond; Craig H. Wittenberg, Mercer Island, all of WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/151,390

(22) Filed: Sep. 10, 1998

(51) Int. Cl.$^7$ ...................................................... G06F 9/45
(52) U.S. Cl. ........................... 717/5; 717/10; 707/4
(58) Field of Search ......................... 717/5, 10; 709/315, 709/316; 707/4

(56) References Cited

U.S. PATENT DOCUMENTS

| | | | |
|---|---|---|---|
| 5,202,985 | * 4/1993 | Goyal .............................. | 707/4 |
| 5,485,617 | 1/1996 | Stutz et al. ...................... | 395/700 |
| 5,517,645 | 5/1996 | Stutz et al. ...................... | 395/700 |
| 5,610,828 | * 3/1997 | Kodosky et al. ................ | 716/11 |
| 5,634,095 | * 5/1997 | Wang et al. ..................... | 395/326 |
| 5,659,543 | * 8/1997 | Ater et al. ....................... | 370/258 |
| 5,692,184 | * 11/1997 | Ardoin et al. .................. | 707/103 |
| 5,745,764 | * 4/1998 | Leach et al. .................... | 709/303 |
| 5,794,038 | * 8/1998 | Stutz et al. ...................... | 709/303 |
| 5,991,802 | * 11/1999 | Allard et al. .................... | 709/219 |
| 6,052,691 | * 4/2000 | Ardoin et al. .................. | 707/102 |

OTHER PUBLICATIONS

Assembling Objects with ClassMagic, Object Dynamics Corporation, U.S.A., 1997, pp. 1–21.

Crane, S. et al., "Configuration Management for Distributed Software Services," Chapman & Hall, Santa Barbara, California, May 1995, pp. 29–41.

Kramer, Jeff et al., "Configuring Distributed Systems," Proc. of 5th ACM SIGOPS Workshop on Models and Paradigms for Distributed Systems Structuring, Mont St. Michel, Sep. 1992, pp. 1–5.

Magee, Jeff et al., "Specifying Distributed Software Architectures," Proc. of the 5th European Software Engineering Conference, Barcelona, Sep. 1995, pp. 137–153.

Title: A Graphical User Interface in Ada for domain–Specific Reuse Libraries, Gordon, ACM. Aug. 15, 1992.*

Title: Querying Atructured dociments with Hypertext links using OODBMS, Christophides et al, ACM, Sep., 1994.*

Title: Executable Connectors: Towards Reusable Design Elements, Ducasse et al, ACM.*

* cited by examiner

Primary Examiner—Mark Powell
Assistant Examiner—Chameli Chaudhuri Das
(74) Attorney, Agent, or Firm—Law Offices of Michael Dryja

(57) ABSTRACT

An assembly method and system for assembling components into an assembly. An assembly provides connectors through which the components can be exported and through which an external entity can be imported. An exported component can be connected to another assembly by importing that exported component into that other assembly. A connector can both expose components to be exported and expose connections through which an external entity can be imported. The assembly provides a mechanism through which the connectors can be exposed to external entities. An external entity can use the connector providing mechanism to retrieve a connector and then use the retrieved connector to export components and establish connections by importing external entities. In addition, the use of a standard connector and of a standard connector providing mechanism allows predefined components to be assembled into assemblies that can expose certain behavior of the components through the connectors in a predefined manner.

33 Claims, 15 Drawing Sheets

METHOD AND SYSTEM FOR ASSEMBLING SOFTWARE COMPONENTS

TECHNICAL FIELD

This invention relates generally to a method and system for combining software objects into combined objects.

BACKGROUND OF THE INVENTION

The cost of developing a complex computer system can be very high. This high cost is attributable to many factors. It can take many man-years of effort to design a complex computer system, and the cost of the design effort is typically only a small fraction of the overall cost of the development effort. Indeed, the cost to develop, test, and document the computer code for such complex computer systems can be many times the cost of the design effort. Although many development tools are available to assist a software developer, development costs are still high.

For many years, "code reuse" and "code sharing" have been promoted as a way to lower the development costs. Typical techniques for "code reuse" and "code sharing" have relied upon object-oriented techniques that make various objects available for reuse. However, such typical techniques have serious drawbacks. Many objects that are made available for reuse provide extensive functionality so that they can be reused by many different types of computer systems that use different functionality of the objects. For example, an object that provides word processing functionality can be very complex and large. Such an object may be reused by a word processing program and by a dialog box manager. Although such an object may provide sophisticated word processing functionality, such sophisticated functionality may not be needed by certain applications that only need rudimentary word processing functionality (e.g., a dialog box manager). Thus, if such an application were to use such word processing object, much of the object's functionality would be unused, and the application would, as a result, be much larger than necessary.

Techniques have been developed that allow a programmer to combine objects with limited functionality into a combined object that has the functionality of its constituent objects. Two such techniques are referred to as "containment" and "aggregation." "Containment" refers to the complete encapsulation of one object (i.e., a containee object) by another object (i.e., container object). Complete encapsulation means that an object external to the container object cannot directly access any of the functionality of the containee object. Rather, the container object receives every request from the external object to access the functionality of the combined object, and the container object may invoke the functionality of the containee object to help provide the requested functionality. "Aggregation" refers to the combining of objects into an aggregated object so that the functionality of one object (i.e., an enclosed object) is exposed directly by that object or indirectly by another object (i.e., enclosing object), and vice versa. Aggregation means that an object external to the aggregate object can directly access functionality of the aggregate object through either the enclosing object or the enclosed object. With both these techniques, an external object views the combined object as a single object and is unaware of the combination. The concepts of the "containment" and "aggregation" are described in *Inside OLE* 2 written by Kraig Brockschmidt and published by Microsoft Press in 1994. "Aggregation" is further described in U.S. Pat. No. 5,745,764, which issued on Apr. 28, 1998, and is hereby incorporated by reference.

The techniques of containment and aggregation have limitations. With containment, the container object needs to be developed with full knowledge of the functionality of the containee object. Thus, the container object cannot be developed independently of the containee object. With aggregation, internal references between the enclosing object and enclosed object have special "Query Interface" and reference accounting rules, which adds complexity and confusion. Moreover, both techniques leave the developer to instantiate and manage the containee and enclosed objects.

Another technique for facilitating code reuse and code sharing is the use of a part-whole hierarchy where each object is responsible for managing the objects immediately below it in the hierarchy. However, when using a part-whole hierarchy, the code for instantiating and managing the sub-objects is placed with the code that provides the functionality of the combined object, which a developer needs to implement for each combined object.

It would be desirable to have a new technique for code reuse and sharing that does not have the drawbacks of these current techniques.

SUMMARY OF THE INVENTION

Embodiments of the present invention provide a method and system for assembling component objects into an assembly object. The assembly object includes a connector object through which the component objects can be exported from the assembly object and through which external objects can be imported into the assembly object. The assembly object provides a mechanism through which an external entity can gain access to the connector object. Once the external entity has gained access to the connector object, the external entity can request the connector object to provide a reference to an exported component object. Also, the external entity can provide to the connector object a reference to an external object to affect the importing of the external object into the assembly object. Embodiments of the assembly system of the present invention provide a light-weight mechanism for instantiating the component objects of an assembly object and a light-weight mechanism for controlling the exporting and importing of objects. Thus, the assembly system relieves the developer of an assembly object from the task of developing code for such instantiation and control.

DETAILED DESCRIPTION OF THE INVENTION

Figure 1:
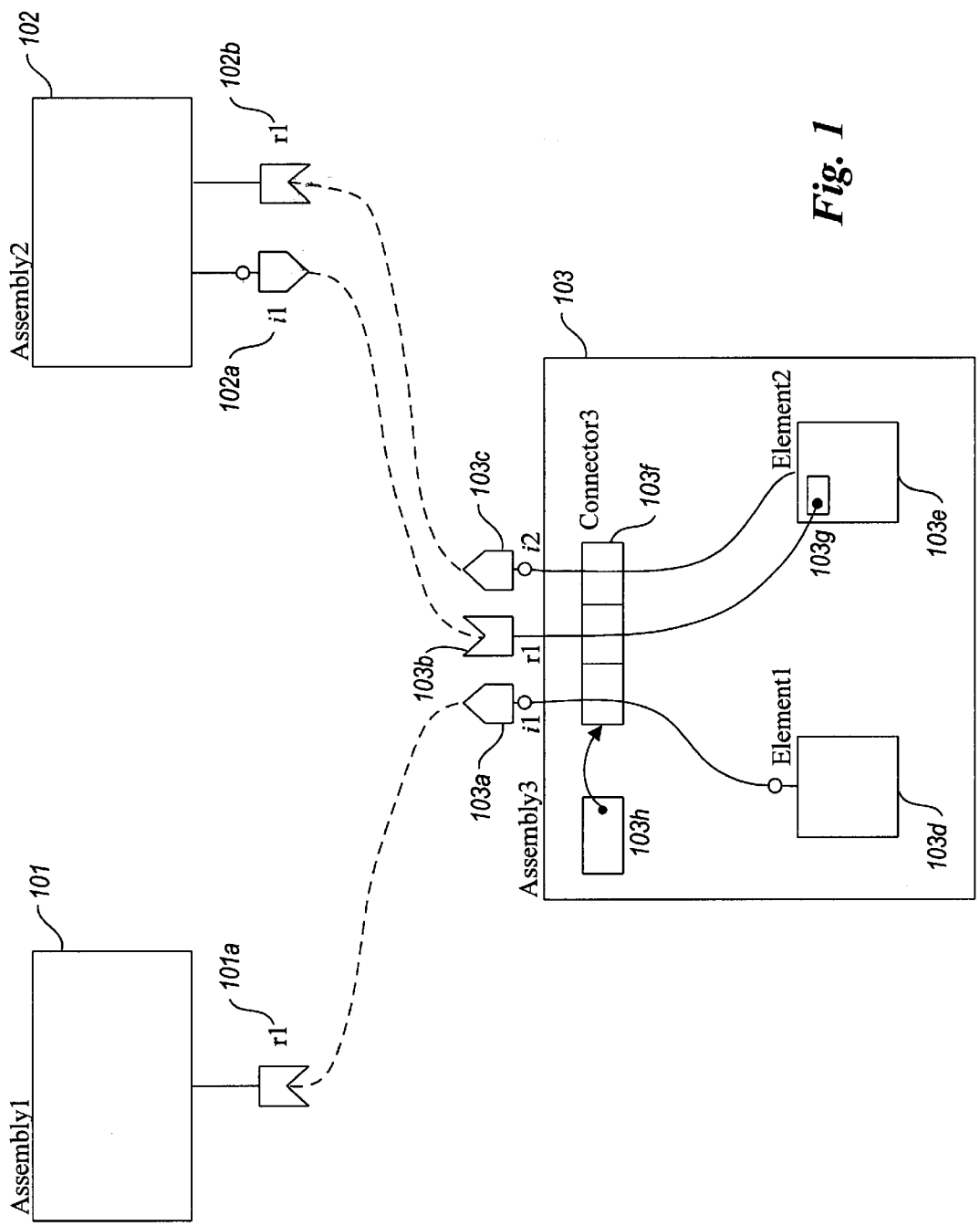
FIG. 1 is a block diagram illustrating an assembly object along with its connection to external entities.

Embodiments of the present invention provide an assembly method and system for assembling components into an assembly. An assembly provides connectors through which the components can be exported and through which an external entity can be imported. An exported component can be connected to another assembly by importing that exported component into that other assembly. A connector can both expose components to be exported and expose connections through which an external entity can be imported. The assembly provides a mechanism through which the connectors can be exposed to external entities. An external entity can use the connector providing mechanism to retrieve a connector and then use the retrieved connector to export components and establish connections by importing external entities. In addition, the use of a standard connector and of a standard connector providing mechanism allows predefined components to be assembled into assemblies that can expose certain behavior of the components through the connectors in a predefined manner. Moreover, an assembly itself can be a component (i.e., sub-assembly) of another assembly. The assembly system of the present invention thus allows a developer to assemble various light-weight components into an assembly that provides only the needed behavior and not more.

The assembly system uses various identifiers to identify assemblies, connectors, components, and connections. Each assembly has a type that uniquely identifies the connectors that are provided by the assembly. Each connector also has a type that uniquely identifies the components and connections exposed by the connector. Each exposed component of a connector has an index that uniquely identifies the component within the connector, and each exposed connection has a role identifier that uniquely identifies the connection within the connector. An external entity exports components by first requesting a certain connector from the assembly using the connector provider mechanism. The external entity then requests the connector to export the component identified by a certain index. An external entity uses that same connector to establish a connection through a connection by providing an external entity (e.g., by providing a reference to the external entity) to the connector and requesting the connector to import the external entity through a connection identified by a certain role.

In one embodiment of the present invention, the assembly has an assembly object that represents the entire assembly and that provides the connector provider mechanism. Each connector is a connector object that provides behavior for registering the components and connections to be exposed and for exposing the registered components and connections. An assembly is created by instantiating the assembly object, the connector objects, and the component objects. The connector objects are registered with the assembly object, and the exposed component objects and connections are registered with the connector objects. Once the creation is complete, an external entity can access the assembly object.

The connector objects delegate the process of establishing a connection to a component object. When a connection is registered with a connector object, the component object (i.e., a delegatee object) that is to establish the connection along with the role identifier is provided to the connector object. When an external entity requests to establish a connection through the connection identified by that role identifier, the connector object requests that the component object perform the connection. If the component object happens itself to be a sub-assembly, then a connector object of the sub-assembly would then delegate the establishing of a connection to one of its component objects.

Connector objects support delegation to two types of connections: unary and binary. External entities do not need to know whether an exposed connection is implemented as a unary or binary connection. The distinction between a unary connection and a binary connection is internal to the assembly that exposes the connection. Unary connections are intended to be primarily used when a component object can directly access the imported external entity. Because the component object can directly access the imported external entity, the connector can pass the reference to the external entity directly to the component object, which is identified when the unary connection is registered with a connector object. Binary connections are intended to be primarily used when a component object can not directly access the imported external entity. In such a case, a special-purpose intermediary object within the assembly manages the connection. To establish a binary connection, the connector passes to the intermediary object a reference to the imported external entity and a reference to the component object. The component object and the intermediate object are identified when the binary connection is registered with a connector object. The intermediary object is then responsible for performing any processing (e.g., data conversion) necessary to effect the connection of the external entity to the component object.

In one embodiment, the assembly system provides an assembly creation mechanism. The assembly creation mechanism processes developer-provided pseudo-code that defines the connector objects and component objects to be included in the assembly and defines the component objects and connections to be exposed by the assembly. The assembly creation component then creates the assembly in accordance with the provided pseudo-code.

FIG. 1 is a block diagram illustrating an assembly object along with its connection to external entities. Assembly3 103 comprises element1 103*d*, element2 103*e*, and connector3 103*f*. (The term "element" refers to a component that is not itself an assembly, and the term "sub-assembly" refers to a component that is itself an assembly.) Assembly3 exposes element1, element2, and connection 103*g* through connector 3. Each element that is exposed through a connector is assigned an index that is unique within the connector. For example, element1 is assigned index "i1," and element2 is assigned index "i2." When an external entity wishes to retrieve of reference to an exposed element, the external entity identifies the element by its index. Each connection through which an external entity can be imported is assigned a role. For example, the connection 103*g* to element2 is assigned role "r1." When an external entity wishes to connect an entity to an assembly, the external entity specifies the role of the connection. Plugs 103a and 103c indicate that an element is exposed, and socket 103b indicates that a connection is exposed. FIG. 1 illustrates the interconnection of assembly3 with external entities, that is, assembly1 101 and assembly2 102. An external entity connects assembly1 to assembly3 by first retrieving a reference 103h to connector3 using the connector provider mechanism of assembly3. The external entity then requests connector3 to export the element identified by index "i1," represented by plug 103a. The external entity then requests a connector of assembly1 to connect assembly3 through the connection identified by role "r1," represented by socket 101a, by passing the retrieved reference of element1 of assembly3. An external entity connects assembly2 to assembly3 by retrieving the reference to a connector of assembly2 and requesting the connector to export the element identified by index "i1," represented by plug 102a. The external entity then requests connector3 of assembly3 to connect assembly2 through the connection identified by role "r1," represented by socket 103b.

Figure 2:
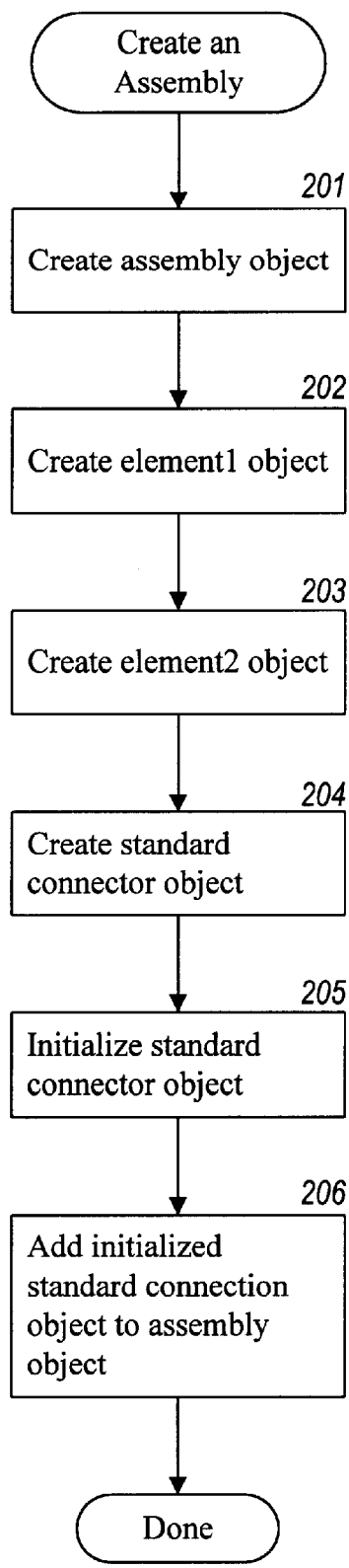
FIG. 2 is a flow diagram illustrating a high-level process of creating an assembly.

FIG. 2 is a flow diagram illustrating a high-level process of creating an assembly. In this illustration, assembly3 of FIG. 1 is created. In step 201, the process creates an assembly object. The assembly object is shown in FIG. 1 as logically containing the elements. In one embodiment, this logical containing is implemented as the assembly object containing references to the connector objects, and the connector objects containing references to the elements. In step 202, the process creates element1. In step 203, the process creates element2. In step 204, the process creates a standard connector object. A standard connector object is an implementation of a connector that performs standard operations of registering and exposing components and connections as described below in more detail. In step 205, the process initializes the standard connector object by indicating which elements and connections to expose. In step 206, the process adds the initialized standard connector object to the assembly object by providing to the assembly object a reference to the connector object. Thus, when an external entity requests the assembly object to provide a connector, the assembly object has the reference to the connector object.

Figure 3:
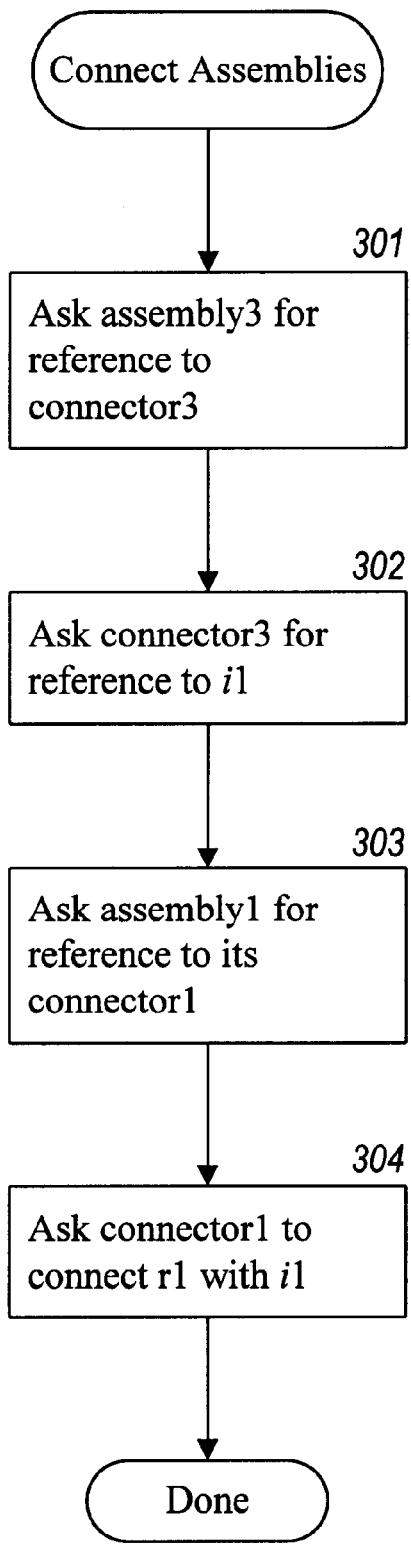
FIG. 3 is a flow diagram illustrating a high-level process of connecting assemblies.

FIG. 3 is a flow diagram illustrating a high-level process of connecting assemblies. In this illustration, assembly1 and assembly3 of FIG. 1 are connected. In step 301, the process asks assembly3 for a reference to connector3 using the connector provider mechanism of assembly3. In step 302, the process asks connector3 for a reference to index "i1." In step 303, the process asks assembly1 for a reference to its connector using the connector provider mechanism of assembly1. In step 304, the process asks the connector of assembly1 to connect element1 of assembly3 through the connection identified by role "r1" of assembly1.

Figure 4:
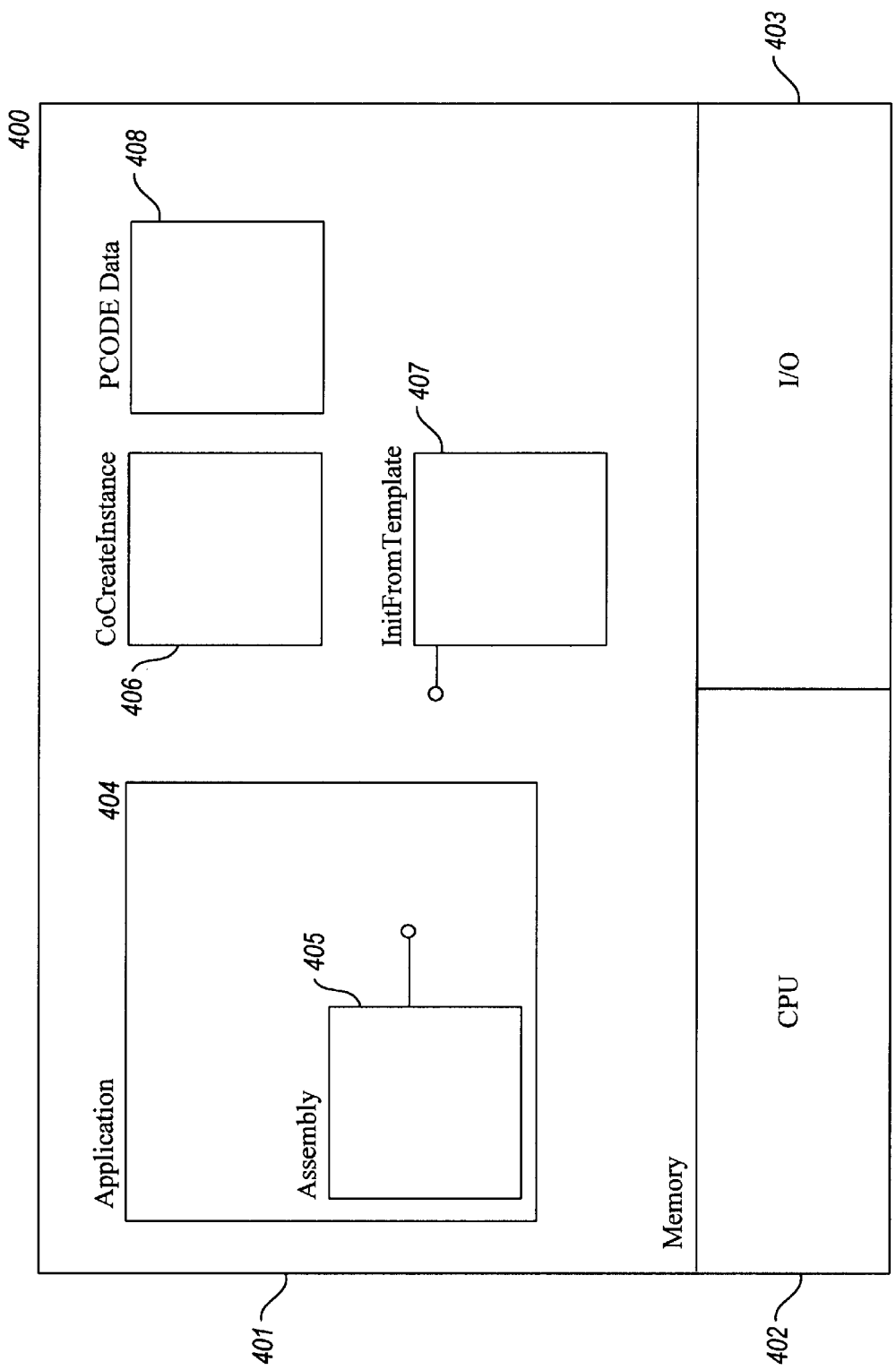
FIG. 4 is a block diagram illustrating a computer system for practicing the present invention.

FIG. 4 is a block diagram illustrating a computer system for practicing the present invention. The computer system 400 includes memory 401, CPU 402, and input/output devices 403. The memory, which is a computer-readable medium, contains application program 404 that contains an assembly object 405. The memory, which is a computer-readable medium, also contains code 406, 407 for supporting the creation of an assembly and data 407 describing the assembly. One skilled in the art will appreciate that the assembly system of the present invention may be practiced on computer systems with varying architectures. In addition, the assembly and its components may be physically located on different computer systems and interconnected using standard remoting techniques. The input/output devices may include standard devices such as a floppy disk drive, a hard disk drive, a CD-ROM, or other computer-readable medium that may contain code or data structures. The input/output devices may also include a propagation medium for transmitting code or data using various transmission techniques including a carrier wave for propagating a signal from one location to another.

The assembly objects and connector objects provide various interfaces through which their behavior can be accessed. The assembly objects provide the IInitFromTemplateStream and IConnectorProvider interfaces, and the connector objects provide the IInitConnector and the IConnector interfaces. These interfaces are described in the following.

IConnectorProvider interface IConnectorProvider: IUnknown
    {
        GetConnector (REFCONNECTORNAME conname, REFIID riid, void **ppvConnector);
    }

The IConnectorProvider interface of an assembly object provides the method GetConnector through which an external entity can retrieve references to the connectors of the assembly. The method GetConnector is passed the name of a connector, which is a globally unique identifier ("GUID"), and the identifier of interface, and returns a reference to identified interface of the connector with the passed name.

---

```
IConnector
    interface IConnector : IUnknown
    {
        GetElement (LONG dwindex, REFIID riid, void **ppvElement);
        Connect (LONG dwRoleId, IUnknown *punkOther);
        GetConnect (LONG dwRoleId, REFIID riid, void **ppvConnectee);
        BatchConnect (DWORD cGet,        // number of Gets
            LONG rgidxGet[ ]             // array of indices to get
            IID rgiidGet[ ],             // corresponding iids
            IUnknown *rgpunkGet[ ],      // array of elements returned
            DWORD rgfGOptional[ ],       // flag gets that can fail
            DWORD cConnU,                // number of Connects
            LONG dwrole[ ],              // array of roles to connect
            IUnknown *rgpunkOther[ ],    // array of elts to connect
            DWORD rgfCOptional[ ],       // flag connections that can fail
            HRESULT rghr[ ],             // array of hresults for individual
                                         //     connections
        );
    };
```

The IConnector interface of a connector object provides methods for retrieving exposed components, connecting an external entity through an exposed connection, and retrieving reference to the external entity connected through a certain connection. As an optimization, the IConnector interface also provides a method through which multiple exposed components can be retrieved and multiple connections established through a single invocation of the method.

IConnector::GetElement

The method GetElement is used by an external entity to retrieve a reference to an exposed component (which may be either an element or a sub-assembly). This method is passed the index of a component and an interface identifier of the component and returns a reference to the identified interface of the indexed component.

IConnector::Connect

The method Connect is used to connect an external entity through an exposed connection to a component of the assembly. The method is passed the role of the connection and a reference to the external entity. If Connect is called more than once, each call replaces the previous connection with a new one. The connection can be disconnected by passing the role of the connection along with a NULL-valued reference.

IConnector::GetConnected

The method GetConnected is used to retrieve a reference to the external entity that is connected through a connection. The method is passed a role and an interface identifier, and returns a reference to the identified interface of the external entity connected to that role.

IConnector::BatchConnect

The method BatchConnect is used to perform retrieval of references to multiple exposed components and to establish multiple connections with a single invocation. To retrieve the references, the method is passed an array of indexes and an array interface identifiers, and returns an array of references to the identified interfaces of the indexed components. To establish the connections, the method is passed an array of roles and an array of references to external entities to be connected to the connections identified by the roles. The method is also passed an array for the retrieved components and an array for the established connections that indicates whether the retrieval or connecting for that component or connection is optional. If it is not optional, then when a failure occurs when retrieving that component or establishing that connection, the method returns without returning any components and without establishing any connections.

```
IInitConnector
    interface IInitConnector : IUnknown
    {
        Init(DWORD cInit,                       // total count of connector interfaces on this connector
             REFIID conniid,                    // connector IID being initialized
             DWORD cGet,                        // number of implemented Gets
             LONG rgidxGet[],                   // implemented Get indices
             IUnknown *rgpunkGet[],             // corresponding elements
             DWORD cConnU,                      // number of connects implemented by unary connectors
             LONG rgdwroleU[],                  // connect roles implemented by unary connectors
             IID rgiidconnDel[],                // iids for corresponding delegatees
             IConnector *rgpconnDel[],          // corresponding delegatees
             LONG rgdwroleDel[],                // corresponding delegatee roles
             DWORD cConnB,                      // number of connects implemented by binary connectors
             LONG rgdwroleB[],                  // connect roles implemented by binary connectors
             IBinaryConnector *rgpbconnDel[],   // corresponding delegatees
             IUnknown *rgpunkOther[],           // corresponding other
             DWORD rgfLeftRight[],              // if true connect(other,.) else connect(.,other)
        );
        Uninit ();
    };
```

The IInitConnector interface of a connector object provides methods for initializing and uninitializing of the connector object. A connector is initialized by registering the components and the connections of the assembly that are to be exposed by the connector. To register components to be exposed, the method Init is passed an array of indexes and an array of references to the components to be identified by those indexes. The method Init is also passed information for registering unary connections that includes an array of roles for connections to be exposed, an array of interface identifiers of the component objects (i.e., delegatees), an array of IConnector interfaces for the delegatees, and an array of roles for the delegatees. The method Init is also passed information for binary connections that include an array of roles, an array of IBinaryConnector interfaces for the delegatees, an array of references to component objects to be connected as part of the binary connection, and an array indicating whether the component object should be connected to the left or right of the binary connection. The method Uninit unregisters all components and connections that have been registered.

IInitFromTemplateStream

Interface IInitFromTemplateStream: IUnknown
{
    HRESULT InitFromTemplate (IStream *pstm);
}

The IInitFromTemplateStream interface of an assembly object has one method that controls the initialization of the assembly object from a passed stream. The initialization data is static configuration data along with the initialization data for assembly parameters. Other assembly data, such as ambient properties, can be passed to an assembly via a connection. One format for the static configuration data and the initialization data for assembly parameters is described below in detail. The initialization data for the assembly parameters is passed in the stream and the static configuration data can be available through the class identifier of the assembly. The assembly can be customized through the parameters.

IBinaryConnector

```
Interface IBinaryConnector: IUnknown
{
    Connect (Unknown punkSource, IUnknown
        punkTarget);
}
```

The IBinaryConnector interface is used when neither end of a desired connection has the needed connection behavior. The method Connect is passed references to the two ends of the connection and performs the behavior necessary to connect them. The IBinaryConnector interface is implemented by intermediary objects and invoked by connector objects to establish binary connections.

Figure 5:
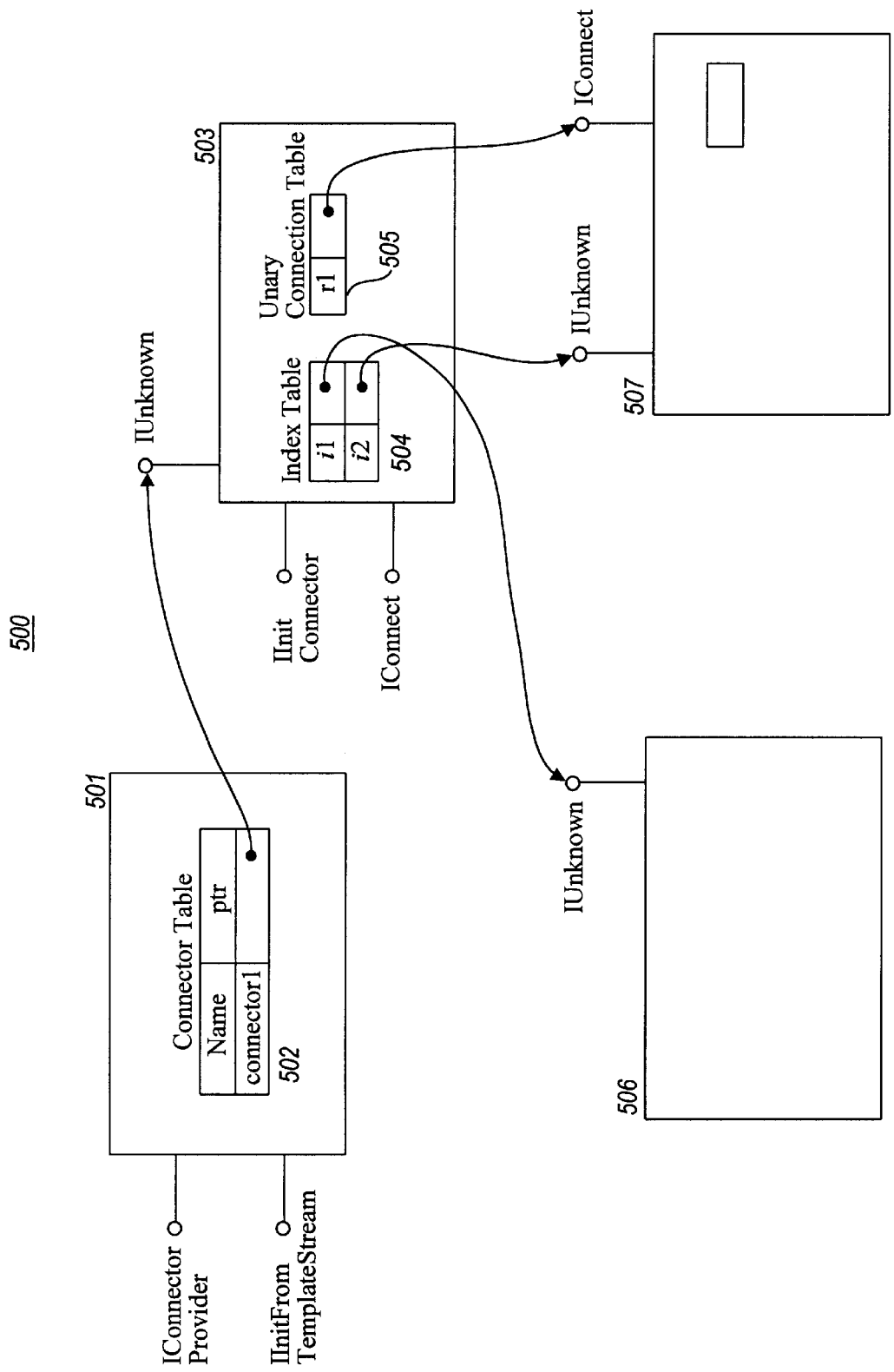
FIG. 5 is a more detailed block diagram of a sample implementation of assembly 3 of FIG. 1.

FIG. 5 is a more detailed block diagram of a sample implementation of assembly3 of FIG. 3. In this figure, the various interfaces used by the assembly system are illustrated along with example data structures used to support the exposing of components and connections. The assembly 500 comprises assembly object 501, connector 503, element 506, and element 507. The assembly object 501 exposes the IConnectorProvider interface through which an external entity can retrieve a reference to the connector 503 of the assembly and exposes the IInitFromTemplateStream interface through which the assembly can be initialized. The assembly object includes connector table 502. The connector table contains the name of the connector along with a reference to the IUnknown interface of the connector object. The connector 503 exposes the IInitConnector interface and the IConnector interface. The IInitConnector interface is used during initialization of the assembly to register components and connections to be exposed. The IConnector interface is used to retrieve references to exposed components and to establish connections through exposed connections. The connector contains an index table 504 and a unary connection table 505. The index table contains an entry for each component that is exposed through the connector. Each entry contains the index of the component and a reference to the component. The unary connection table contains an entry for each unary connection. Each entry contains the identification of the role of the connection and a pointer to an interface of a delegatee object to which the connection process is to be delegated. In this example, the interface of the delegate object is the IConnector interface. In one embodiment, each entry of the unary connection table may contain the role of the connection, the interface identifier of the delegatee object, a reference to the delegates object, and a role for the delegatee object. Although not needed in this example, the connector object may also include a binary connection table.

Figure 6:
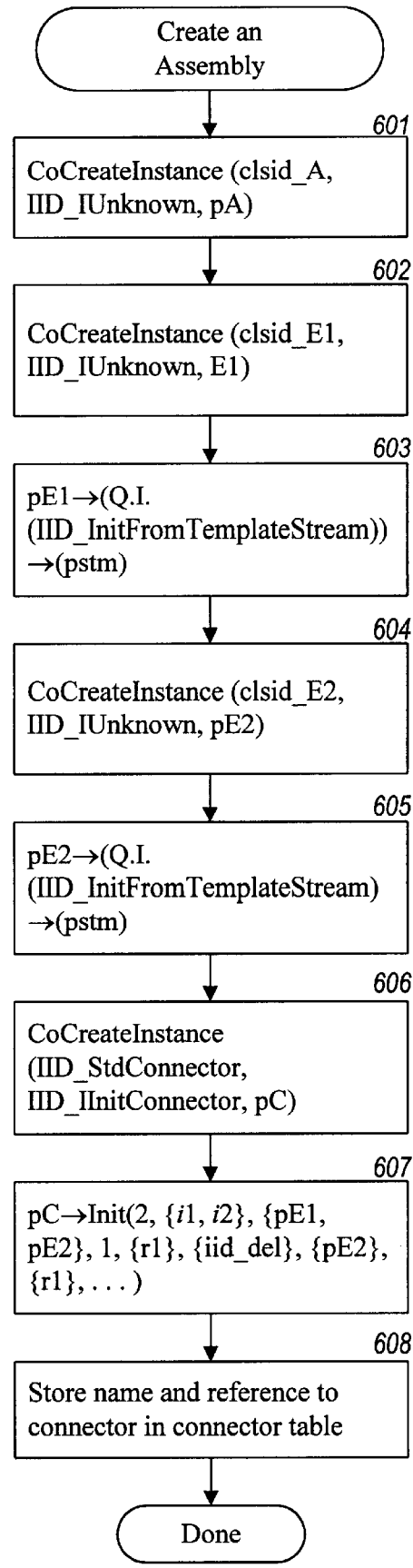
FIG. 6 is a low-level flow diagram of the process of initializing an assembly 3 of FIG. 5.

FIG. 6 is a low-level flow diagram of the process of initializing an assembly3 of FIG. 5. In step 601, the process invokes the function CoCreateInstance passing the class identifier of the assembly. The function creates an instance of an assembly object 501 of the passed class identifier and returns a reference to the assembly object. In step 602, the process invokes the function CoCreateInstance passing the class identifier of the first element. This function creates an instance of the passed class identifier and returns a reference to the element. In step 603, if the first element supports the IInitFromTemplateStream interface, then the processes invokes the method Init of that interface passing a reference to the string that contains the initialization data for the element. Steps 604 and 605 are similar to steps 602 and 603 except that they are applied to the second element of the assembly. In step 606, the process invokes the function CoCreateInstance to create an instance of the standard connector and to return a reference to the IInitConnector interface. In step 607, the process invokes the method Init of the IInitConnector interface to initialize the connector with the components and connections to be exposed. In step 608, the process adds an entry for the connector to the connector table of the assembly object.

Figure 7:
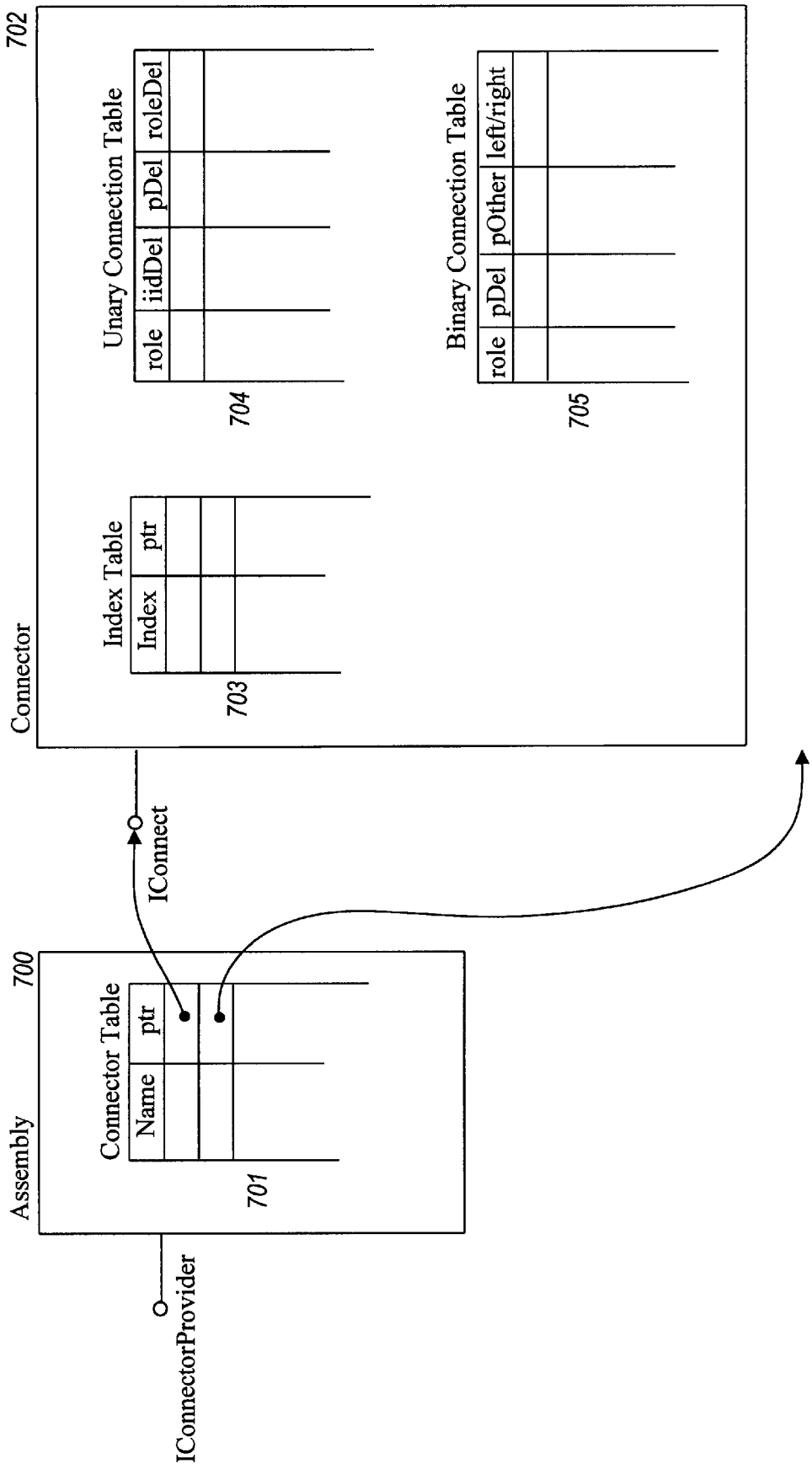
FIG. 7 illustrates the data structures and interfaces of an assembly object and its connector objects in one embodiment.

FIG. 7 illustrates the data structures and interfaces of an assembly object and its connector objects in one embodiment. As illustrated, the assembly object 700 provides IConnectorProvider interface, and the connector object provides the IConnector interface. The assembly object includes connector table 701 that contains an entry for each connector within the assembly. Each entry contains the name of the connector along with a reference to the connector. The connector object 702 contains an index table 703, a unary connection table 704, and a binary connection table 705. The index table contains an entry for each component that is exposed by the connector. Each entry contains the index of the component along with a reference to an exposed interface of the component. The unary connection table contains an entry for each unary connection exposed by the connector. Each entry identifies the name of the role of the connection and information relating to the delegatee object that is responsible for performing the connection. The delegatee information includes the interface identification (iidDel) of the delegatee object, a reference to the delegatee object (pDel), and the role of the delegatee object (roleDel). The binary connection table contains an entry for each binary connection exposed by the connector. Each entry identifies the name of the role of the connection and information relating to the intermediary object with the IBinaryConnector interface and the component object with which the binary connection is to be established. The information includes a reference to the intermediary object (pDel), a reference to the component object (pOther), and an indication whether the component object is to be on the left or right of the binary connection.

Figure 8:
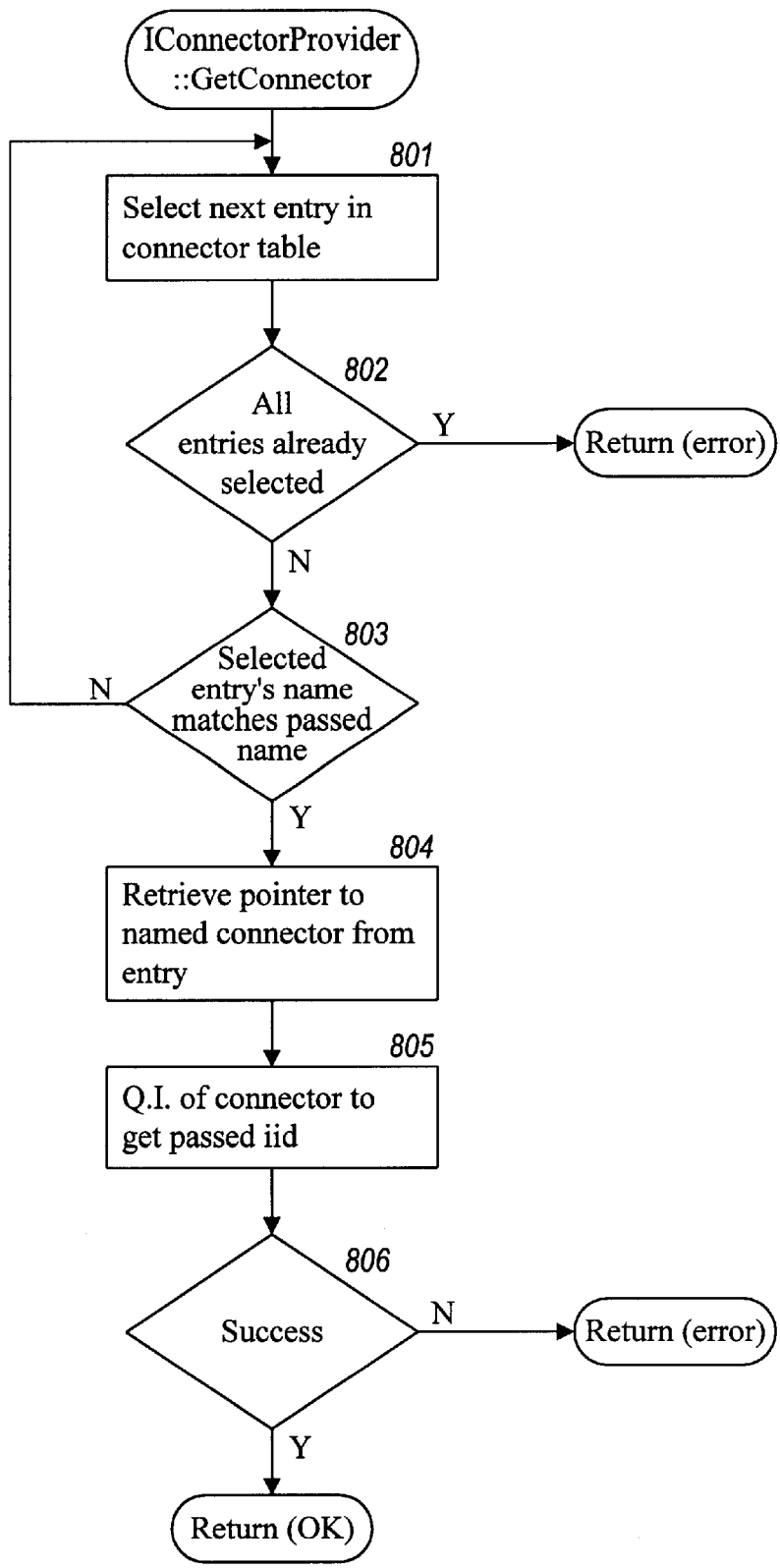
FIG. 8 is a flow diagram of one possible implementation of the method GetConnector of the IConnectorProvider interface.

FIG. 8 is a flow diagram of one possible implementation of the method GetConnector of the IConnectorProvider interface. This method is passed the name of a connector and the identifier of an interface, scans the connector table for any entry with that name, and returns a reference to the identified interface of the connector with name. In step 801, the method selects the next entry in the connector table starting with the first entry. In step 802, if all the entries have already been selected, then no entry with the passed name is in the connector table and the method returns an error indicator, else the method continues at step 803. In step 803, if the name of the selected entry matches the passed name, then the method continues at step 804, else the method loops to step 801 to select the next entry. In step 804, the method retrieves the pointer to the named connector from the selected entry. In step 805, the method queries the interface of the connector to retrieve a reference to the passed interface identifier. In step 806, if the query interface was successful, then the method returns a success indicator, else the method returns an error indicator.

Figure 9:
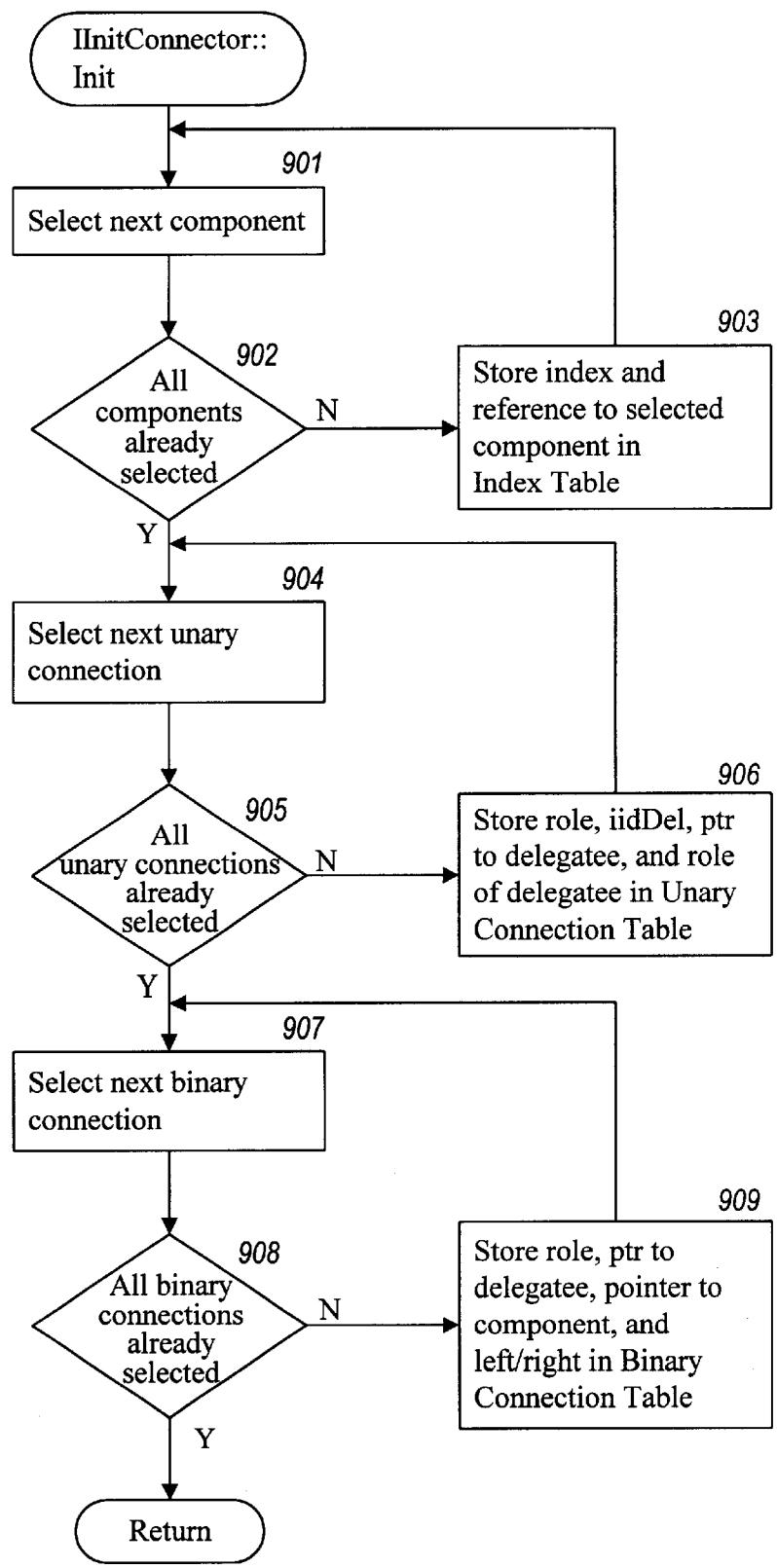
FIG. 9 is a flow diagram of one possible implementation of the method Init of the IInitConnector interface.

FIG. 9 is a flow diagram of one possible implementation of the method Init of the IInitConnector interface. This method is passed a list of the components, unary connections, and the binary connections to be exposed by the connector. The method initializes the internal tables of the connector. In steps 901–903, the method loops adding an entry in the index table for each component that is to be exposed. In step 901, the method selects the next component to be exposed, starting with the first component. In step 902, if all the components have already been selected, then the method continues at step 904, else the method continues at step 903. In step 903, the method stores the index and a reference to the selected component in an entry of the index table and loops to step 901 to select next component. In steps 904–906, the method loops adding an entry for each unary connection to the unary connection table. In step 904, the method selects the next unary connection to be exposed starting with the first. In step 905, if all the unary connection have already been selected, then the method continues at step 907, else the method continues at step 906. In step 906, the method stores the role, the interface identifier of the delegates object, a pointer to the delegatee object, and the role of the delegates object in an entry of the unary connection table and loops to step 604 to select the next unary connection. In step 907, the method loops adding an entry to the binary connection table for each binary connection to be exposed. In step 907, the method selects the next binary connection to be exposed starting with the first. In step 908, if all the binary connections have already been selected, then the method returns, else the method continues at step 909. In step 909, the method stores the role, the reference to the delegatee object, the reference to the component object, and the indication as to left or right in an entry of the binary connection table and loops step 907 to select the next binary connection.

Figure 10:
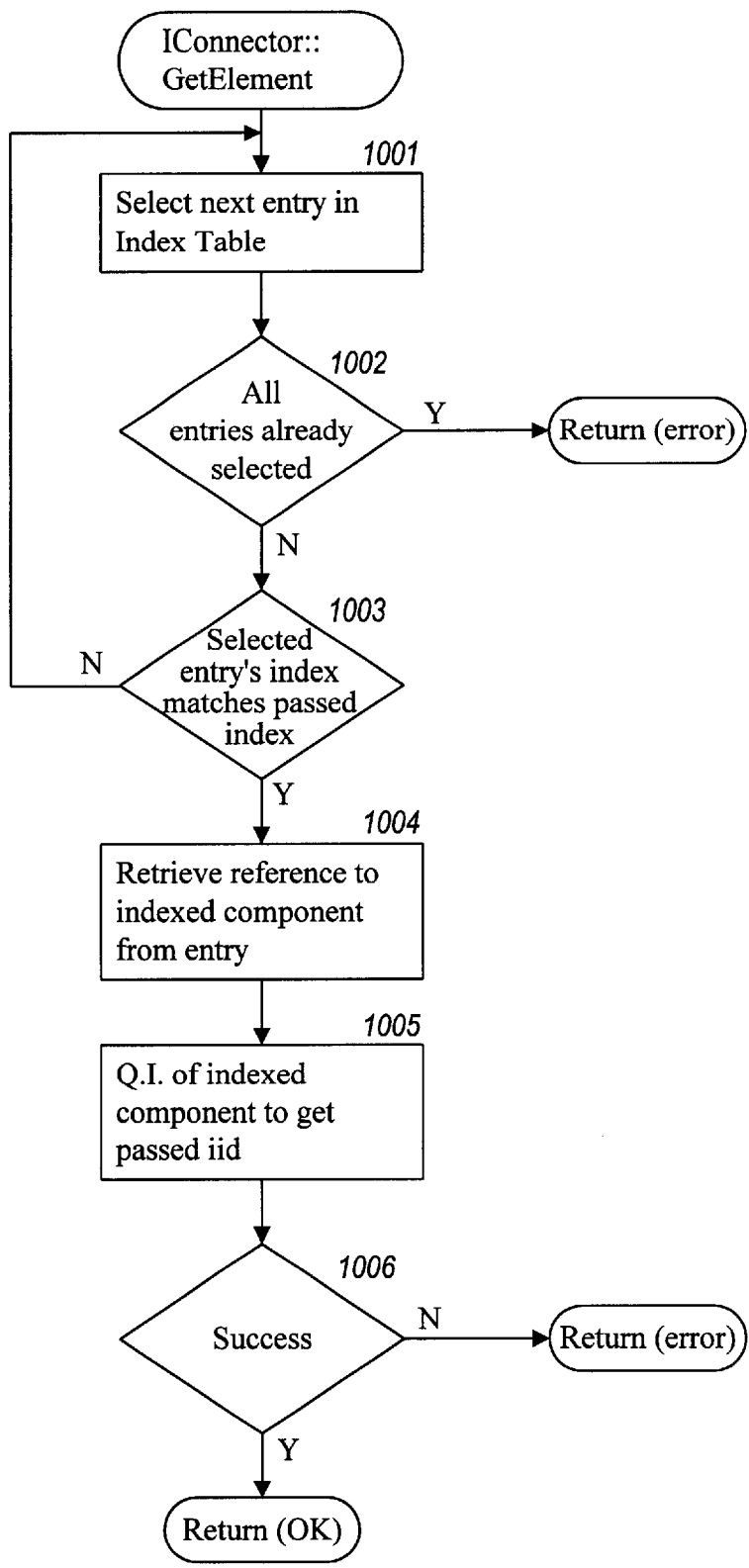
FIG. 10 is a flow diagram of one possible implementation of the method GetElement of the IConnector interface.

FIG. 10 is a flow diagram of one possible implementation of the method GetElement of the IConnector interface. This method is passed the index of an exposed component along with an interface identifier and returns the reference to the identified interface of the exposed component. In steps 1001–1003, the method loops searching for an entry in the index table that matches the passed index. In step 1001, the method selects the next entry in the index table starting with the first. In step 1002, if all the entries have already been selected, then there is no entry with the passed index in the index table and the method returns an error indicator, else the method continues at step 1003. In step 1003, if the index of the selected entry matches the passed index, then the method continues at step 1004, else the method loops to step 1001 to select next entry. In step 1004, the method retrieves the reference in the selected entry. In step and 1005, the method retrieves a reference to the passed interface identifier for the component by invoking the method QueryInterface of the indexed component. In step 1006, if the retrieval of the reference to the identified interface was successful, then the method returns a success indicator, else the method returns an error indicator.

Figure 11:
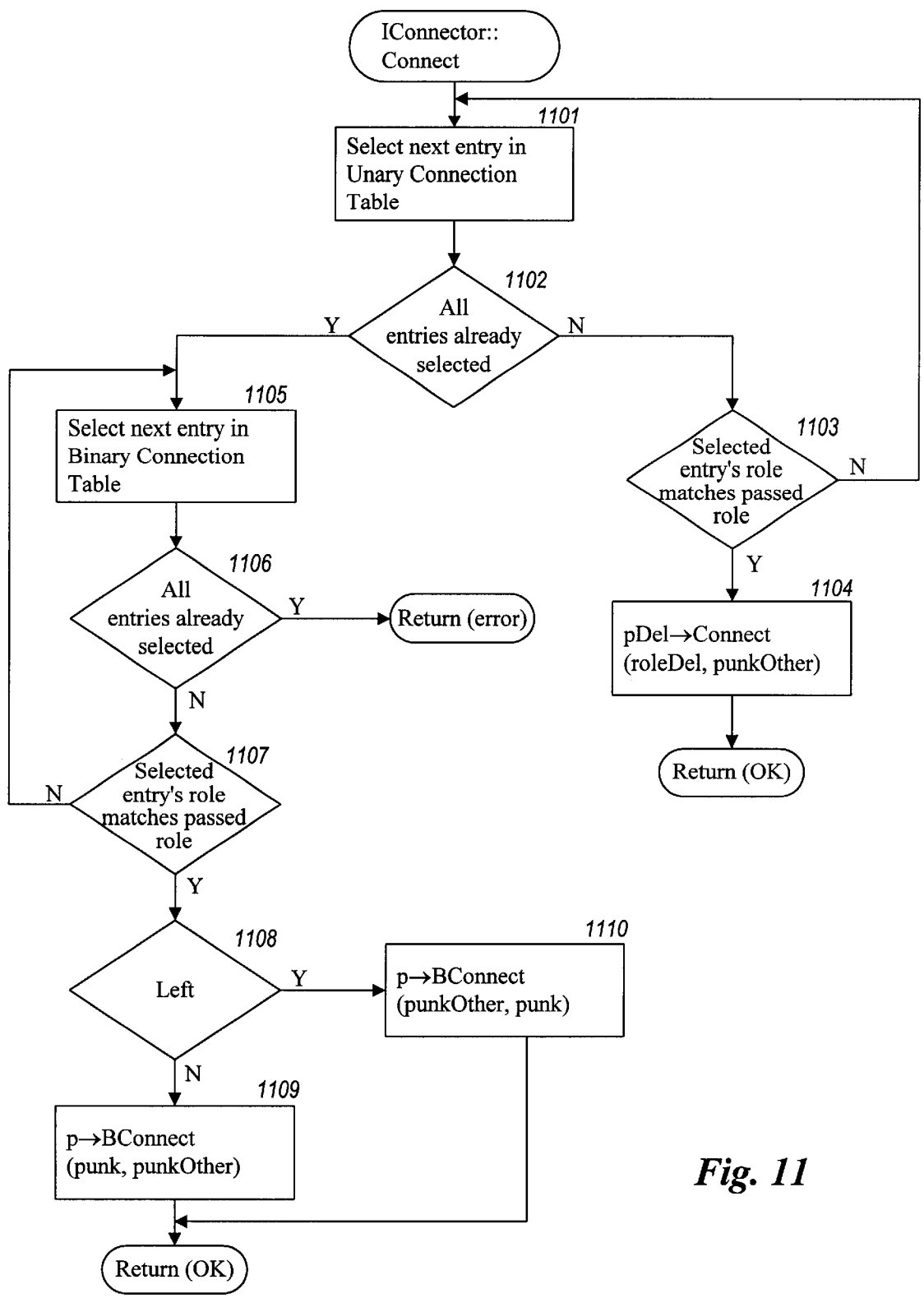
FIG. 11 is a flow diagram of one possible implementation of the method Connect of the IConnector interface.

FIG. 11 is a flow diagram of one possible implementation of the method Connect of the IConnector interface. This method is passed the role of a connection along with a reference to the external entity to be connected. The method effects the connection by delegating responsibility of a unary connection to a component object and a binary connection to an intermediary object. In steps 1101–1103, the method loops determining whether the passed role is in the unary connection table. In step 1101, the method selects the next entry in the unary connection table starting with the first. In step 1102, if all entries have already been selected, then the method continues at step 1105, else the method continues at step 1103. In step 1103, if the role of the selected entry matches the passed role, then the method continues at step 1104, else the method loops to step 101 to select the next entry. In step 1104, the method delegates the connection to the component object referenced in the selected entry and returns. In steps 1105–1110, the method loops determining whether the passed role is in the binary connection table. In step 1105, the method selects the next entry in the binary connection table starting with the first. In step 1106, if all the entries in the binary connection table have already been selected, then the method returns an error indicator, else the method continues at step 1107. In step 1107, if the role of the selected entry matches the passed role, then the method continues at step 1108, else the method loops step 1105 to select the next entry. In step 1108, if the left/right flag indicates left, then the method continues at step 1110, else the function continues at step 1109. In step 1109–1110, the method delegates connection to the intermediary object and returns.

Figure 12:
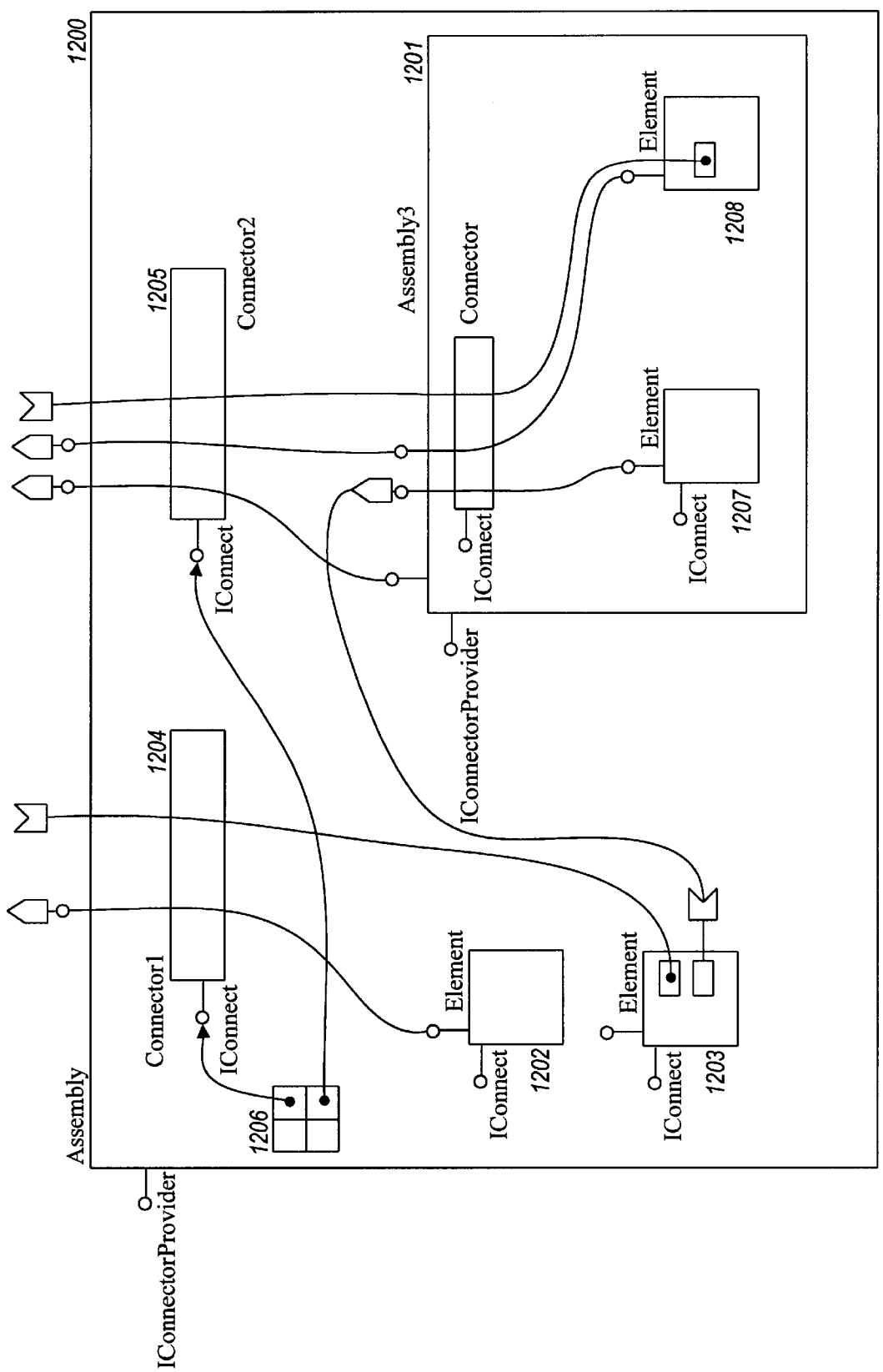
FIG. 12 is a block diagram illustrating one possible embodiment of an assembly which contains two components that are elements and one component that is a sub-assembly.

FIG. 12 is a block diagram illustrating one possible embodiment an assembly which contains two components that are elements and one component that is a sub-assembly. Assembly 1200 contains sub-assembly 1201, elements 1202, 1203, and connectors 1204, 1205. The sub-assembly corresponds to assembly3 of FIG. 1. Connector 1204 exposes element 1202 and a connection to element 1203. Connector 1205 exposes sub-assembly 1201, element 1208 of the sub-assembly, and a connection to element 1208 of the sub-assembly. Element 1203 exposes a connection that is internally connected (within assembly 1200) to element 1207 of the sub-assembly.

In one embodiment, the assembly system provides a PCODE interpreter that inputs pseudo-code that describes the initialization of an assembly. The PCODE interpreter is implemented by the method InitFromTemplateStream of the IInitFromTemplateStream interface of the assembly object. The PCODE interpreter initializes the assembly object in accordance with the pseudo-code for the assembly object as modified by assembly parameters passed via the stream to the method.

Table 1 provides a description of the pseudo-code in one embodiment of the PCODE interpreter. The table contains one entry for each pseudo-code instruction (e.g., "Create Instance"). The entry identifies the operation code for the instruction (e.g., "10") along with its operands (e.g., "<result-index>" and "<param-index>"). The entry also contains a general description of the interpretation performed by the PCODE interpreter for that instruction. The array "object [ ]" referenced in Table 1 logically is an array maintained by the interpreter to keep track of the components and connectors of the assembly. The variable "param-index" refers to an internal parameter that is static or an external parameter this dynamic and is passed in the stream. The array "OA [ ]" is an array of indexes into the object [ ].

Each operation has a corresponding batch version in which multiple executions of the operation can be indicated by a single instruction. The format of the batch instruction is the batch operation code followed by the number of executions, followed by an array of the first operands, followed by an array of the second operands, and so on.

TABLE 1

Figure 13:
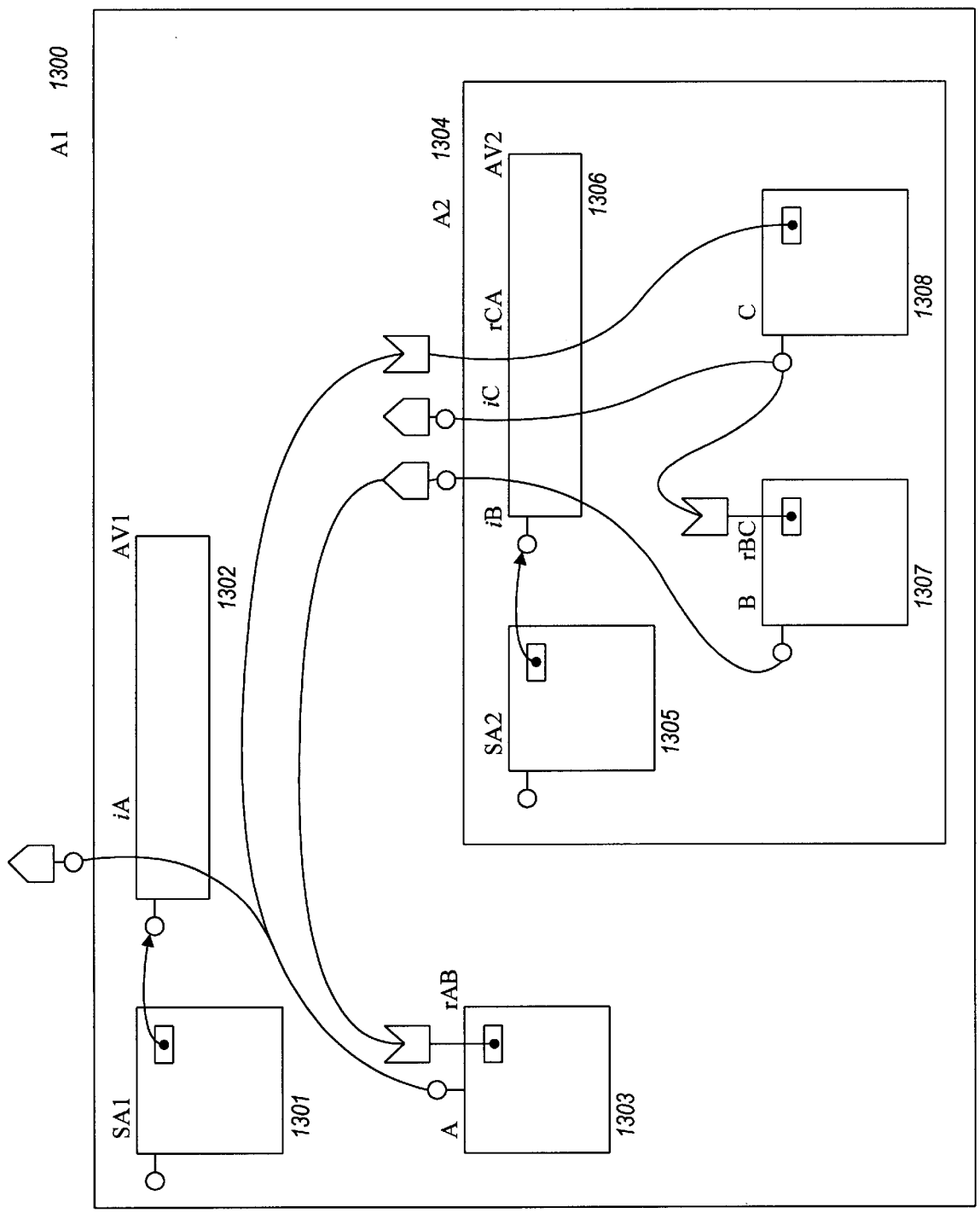
FIG. 13 is a block diagram illustrating an assembly.

Create Instance
code:       10
instruction:
            10 <result-index><param-index>
interpretation:
            object[<result-index >] = CoCreateInstance(clsid of param-index)
            object[<result-index>] -> IInitFromTemplateStream::InitFromTemplate (substream of param-index)
Create Aggregate Part
code:       30
instruction:
            30 <result-index > <param-index> <outer-index>
interpretation:
            object[<result-index> = CocreateInstance(object[<outer-index>], clsid of param-index)
            object[<result-index >] -> IInitFromTemplateStream::InitFromTemplate (substream of param-index)
Initialize Connector
code:       50
instruction:
            50 <index> <get-count> <get-index-array> <get-elt-index-array> <uconn-count> <role-array> <del-index-array>
                    <del-role-array> <bconn-count> <brole-array> <bdel-index-array> <other-index-array>
                    <left-right-array>
interpretation:
            object[<index>] ->IInitConnector::Init(<get-count>, <get-index-array>, OA[<get-elt-index-array>],
                    <uconn-count>, <urole-array>, <iid-array>, OA[<udel-index-array>], <del-role-array>,
                    <bconn-count>, <brole-array>, OA[<bdel-index-array>], OA[<other-index-array>],
                    <left-right-array>)
Name Connector
code:       70
instruction:
            70 <index> <connector-uid>
interpretation:
            correlates the <connector-guid> in the assembly object so that
            object[<index>] -> iConnectorProvider::GetConnector(<connector-guid>, iid, ppv) returns the result of
                    QueryIntenface for iid for <connector-uid>
Get Connector
code:       90
instruction:
            90 <result-index> <provider-index> <connector-uid> <connector-iid>
interpretation:
            object[<result-index>] object[<provider-index>] -> IConnectorProvider::GetConnector(<connector-guid>,
                    <connector-iid>, ppv)
Get Connector Element
code:       110
instruction:
            110 <result-index> <connector-index> <connector-iid> <index> <iid>
interpretation:
            object[<result-index>] = object[<connector-index>] -> QueryInterface(<connector-iid>) ->
                    IConnector::GetElement(<index>, <iid>)
Unary Connect
code:       130
instruction:
            130 <connector-index> <connector-iid> <role-id> <other-index>
interpretation:
            object[<connector-index>] -> QueryInterface(<connector-iid>) -> IConnector::Connect((<role-id>,
                    object[<other-index>])
Unary Batch Connect
code:       150
instruction:
            150 <connector-index> <connector-iid> <get-count> <index-array> <iid array> <optional get-flag-array>
                    <result-index-array> <connect-count> <role-array> <other-index-array> <optional connect-
                    flag-array>
interpretation:
            object[<connector-index>] -> QueryInterface(<connector-iid>) -> IConnector::BatchConnect((<get-count>,
                    <index-array> <iid-array>, <optional get-flag-array>, &rgpunkGet, <connect-count> <role-
                    array> OA[<other-index-array>] <optional connect-flag-array>, &rghr)
            The interpreter assigns the rgpunkGet results to <result-index-array> slots in the object array. The array rghr of
                    HRESULTs returned from IConnector::BatchConnect is handled by the interpreter. It is
                    not visible in the PCODE.
Binary Connect
code:       170
instruction:            170 <connector-index> <source-index> <dest-index>
interpretation:
            object[<connector-index>] -> IBinaryConnector::Connect(object[<source-index>], object[<dest-index>])
End
code:       0
instruction:
            0
interpretation:
            end instruction FIG. 13 is a block diagram illustrating an assembly that is initialized by the PCODE interpreter. The assembly A1 1300 contains assembly object SA1 1301, connector Av1 1302, element A 1303, and sub-assembly A2 1304. Sub-assembly A2 1304 contains assembly object SA2 1305, connector Av2 1306, element B 1307 and element C 1308. Element B exposes a connection (role "iBC"). Sub-assembly A2 exposes element B (index "iB") and element C (index "iC") and a connection to element C (role "rCA") through connector Av2. Element A exposes a connection (role "rAB"). Assembly A1 exposes element A (index "iA") through connector Av1. Element C is connected to (imported to) element B via connection rBC and element B of sub-assembly A2 is connected to (imported to) element A via connection rAB.

Figure 14:
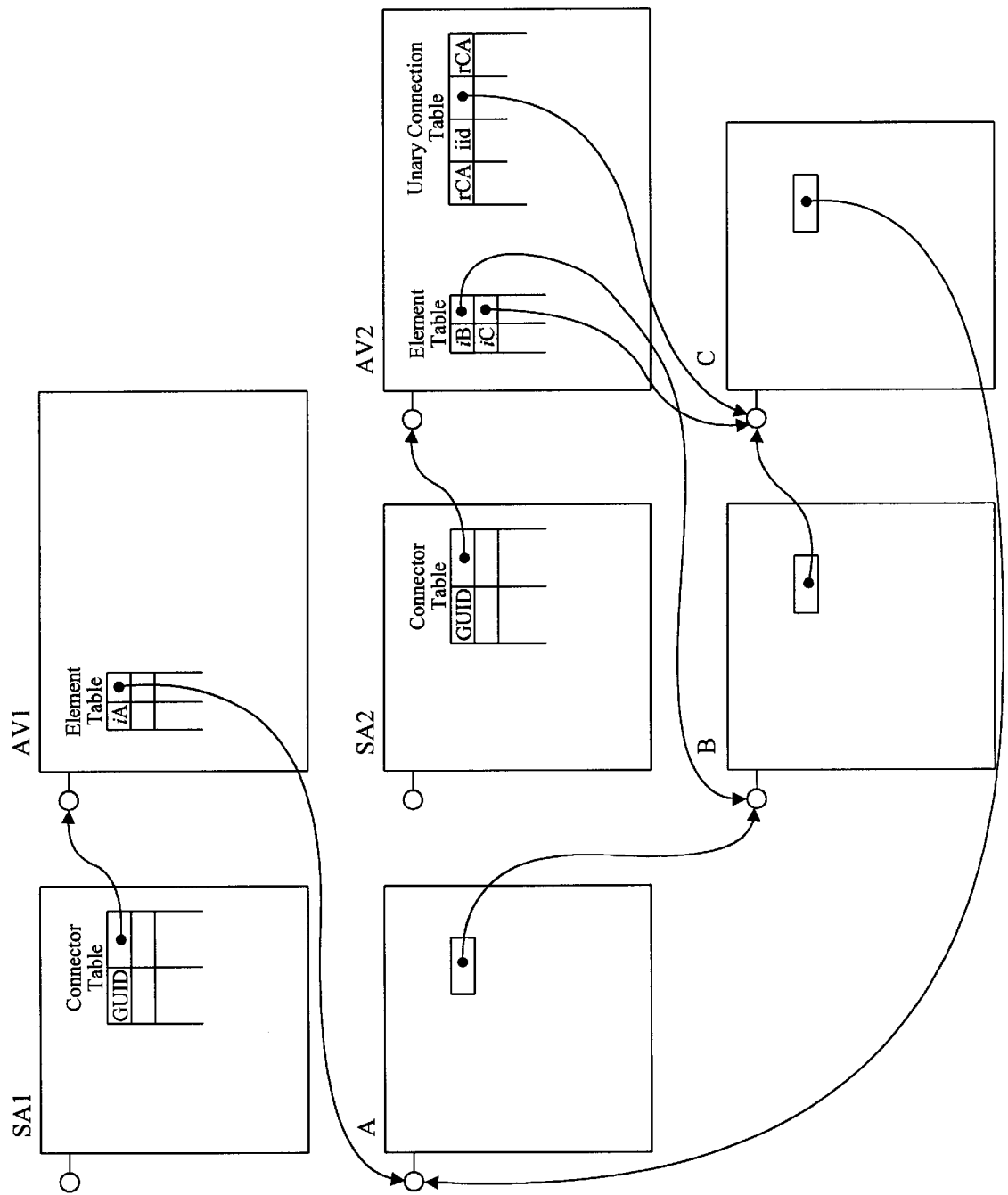
FIG. 14 is a block diagram indicating the internal data structures in one possible embodiment of the assembly of FIG. 13.

Table 2 describes the creation and initialization of the assembly of FIG. 14. This creation and initialization can be either programmed directly by a developer or specified as pseudo-code that is executed by the PCODE interpreter. The indentation of the statements of Table 2 reflect processing performed by the invoked method. For example, statement 7 contains a statement that invokes the method Init of the IID_InitFromTemplateStream of the subassembly SA2, and statements 8–20 represent the processing performed during that invocation. Once assembly A1 is developed, the assembly is created and initialized by executing statements 1 and 2. The method Init of the IID_InitFromStreamTemplate interface can either be developed to include the code representing statements 3–33 and using any external parameters specified in the passed stream or be developed to retrieve the internal parameter for the class of assembly A1 and invoke the PCODE interpreter passing internal and external parameters.

13. Table 3 lists the pseudo-code for the creation of assembly A1 and assembly A2. When the PCODE interpreter encounters each PCODE instruction it performs the interpretation as shown in Table 2. The pseudo-code for assembly A1 uses three parameters as indicated by the "{0, 1, 2}" of the "pcBatchCreateInstance," which is the batch form of the CreateInstance operation. The external parameters may be specified by higher index numbers (i.e., parameter index 2). Thus, the type of the A element can specified at the time the assembly is created to customize the assembly.

TABLE 3

Figure 15:
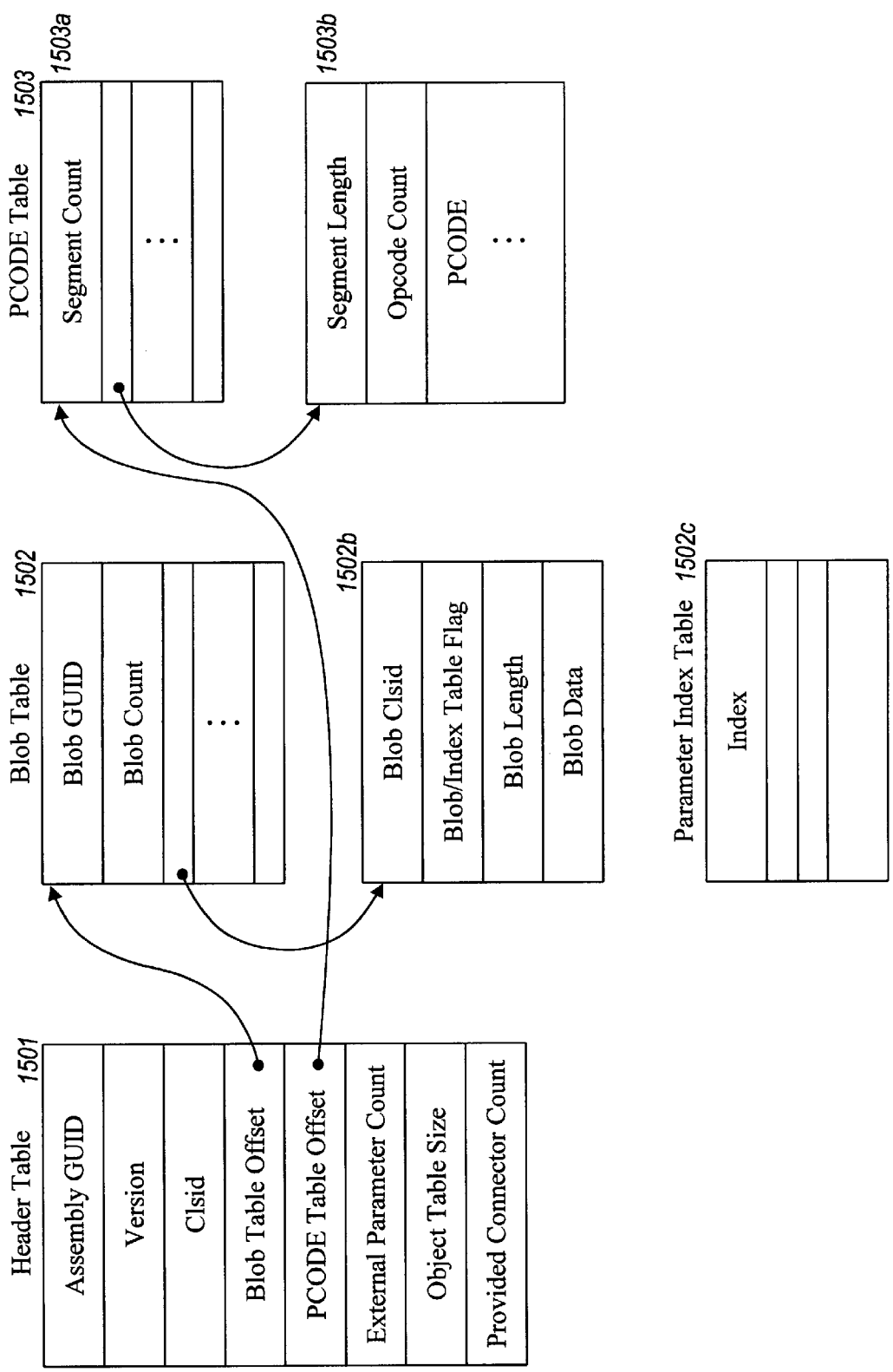
FIG. 15 is a block diagram illustrating one embodiment of a data structure for initializing an assembly.

A1
    pcBatchCreateInstance 3 {SA2, Av1, A} {0, 1, 2}
    pcGetConnector V, GUID_Av2, IID_Iunknown
    pcUaryBatchConnect V, 1, {iB}, {IID_Iunknown}, {false}, {B}, 1, {rCA}, {A}, {false}
    pcUaryConnect A, IID_IConnector, rAB, B
    pcInitizeConnector Av1, IID_Unknown, 1, {iA}, {A}, 0, 0, 0, 0, 0, 0, 0, 0, 0
    pcNameConnector Av1, GUID_Av1
    pcEnd
A2
    pcBatchCreateInstance 3 {Av2, B, C} {0, 1, 2}
    pcUaryConnect B, IID_IConnector, rBC, C
    pcInitizeConnector Av2, IID_Unknown, 2, {iB, iC}, {B, C}, 1, {rCA}, {C}, {rCA}, 0, 0, 0, 0, 0
    pcNameConnector Av2, GUID_Av2
    pcEnd FIG. 15 is a block diagram illustrating one embodiment of a data structure that holds information that describes and is used for initialization assembly. This PCODE assembly structure includes a Header table 1501, a Blob table 1502, and a PCODE table 1503. The Header table contains the GUID of the assembly, a version number, the class identifier

TABLE 2

```
1    CoCreateInstance(CLSID_SA1, IID_IUknown, &pSA1)
2    PSA1->QueryInterface(IIDIinitFromTeplateStream)->Init(pstm)
3        CoCreateInstance(CLSID_A, IID_IUknown, &pA)
4        pA->QueryInterface(IID_IinitFromTeplateStream)->Init(pstm)
5
6        CoCreateInstance(CLSID_SA2, IID_IUnknown &pSA2)
7        pSA2->QueryInterface(IID_IinitFromTeplateStream)->Init(pstm)          // load p-code for SA2
8
9            CoCreateInstance(CLSID_B, IID_IUnknown, &pB)
10           pB->QueryInterface(IID_IinitFromTeplateStream)->Init(pstm)
11
12           CoCreateInstance(CLSID_C, IID_IUnknown, &pC)
13           pC->QueryInterface(IID_IinitFromTeplateStream)->Init(pstm)
14
15           pB->QueryInterface(IID_IConnector)->Connect(rBC, pC)               // connects B to C
16
17           CoCreateInstance(CLSID_StdConnector, IID_IInitConnector, &pAv2)   // create connector for SA2
18           pAv2 ->Init(2, {iB, iC}, {pB, pC}, 1, {rCA}, {pC}, {rCA}, 0, 0, 0, 0, 0)   // populate the connector
19
20           correlate connector pAv2 and GUID_Av2 with assembly pSA2         // Add connector to SA2
21
22       pV = pSA2->QueryInterface(IID_IConnectorProvider)->GetConnector(GUID_Av2, IID_Iconnector)
23
24       // Connect A to B
25       pB = pV->GetElement(iB, IID_IUnknown)
26       pA->QueryInterface(IID_IConnector)->Connect(rAB, pB)
27
28       // Connect C to A
29       pV ->Connect(rCA, pA)
30
31       CoCreateInstance(CLSID_StdConnector, IID_IInitConnector &pAv1)        // create connector for SA1
32       pAv1 ->Init(1, iA, pA, 0, 0, 0, 0, 0, 0, 0, 0)                        // populate the connector
33       correlate connector pAv1 and GUID_Av1 with assembly pSA1              // Add connector to SA1
```

FIG. 14 is a block diagram indicating the internal data structures in possible embodiment of the assembly of FIG. of the assembly, an external parameter count, the size of the object array, and the count of the number of connectors provided by the assembly. The Blob table contains a Blob header 1502*a* and various Blobs 1502*b*. (A "Blob" refers to any collection of data.) The Blob header contains a GUID of the Blob, a count of the number of Blobs in the Blob table, and a pointer to each Blob. A Blob contains the class identifier of the object represented by the Blob, a flag indicating whether this Blob contains Blob data or a table of external parameters for the Blob, the length of the Blob, and the Blob data. Each Blob corresponds to an object that can be instantiated by the pseudo-code when the assembly is created. The Blob data is passed to the instantiated object to initialize it. Each Blob corresponds to an internal parameter. When the object to be instantiated is itself an assembly the Blob data is a parameter index table 1502*c* that contains the parameter indexes of the Blobs that are to be passed to the assembly as external parameters. External parameters are passed in a Blob table. Thus, the PCODE interpreter creates a Blob table containing the Blobs for the parameters indexed by the parameter Blob table. The PCODE table includes a PCODE header 1503*a* and various PCODE segments 1503*b* that contain the PCODE.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer-readable medium containing an assembly comprising:
    a plurality of unaggregated components, one or more components providing a role;
    a connector having a connector interface for providing references to one or more of the components for exporting the one or more components without aggregation and for connecting an entity external to the assembly to the provided role for importing the entity without aggregation; and
    a connector provider interface of the assembly for providing a reference to the connector within the assembly.

2. The computer-readable medium of claim 1 wherein the connector has a initialization interface through which the connector is notified of the components for which it is to provide references and is notified of the role of one or more components.

3. The computer-readable medium of claim 1 wherein the connector has a name and wherein the connector provider interface receives the name and returns a reference to a connector with that name.

4. The computer-readable medium of claim 1 wherein when an entity external to the assembly is being connected to the role, the connector delegates the responsibility to connect the entity external to the assembly to the component that provides the role.

5. The computer-readable medium of claim 1 wherein the component is an element.

6. The computer-readable medium of claim 1 wherein the component is a sub-assembly.

7. A method in a computer system for assembling components into an assembly, the method comprising:
    instantiating a plurality of unaggregated components;
    instantiating a connector for exporting one or more of the components without aggregation and for importing an entity external to the assembly into a component of the assembly without aggregation; and
    identifying to the instantiated connector the one or more of the components that are to be exported and the component into which the entity external to the assembly is to be imported,
    wherein the instantiated connector provides references to the one or more of the components that are to be exported and receives a reference to the entity external to the assembly that is to be imported.

8. The method of claim 7 wherein the instantiated connector includes an initialization interface and the identifying includes invoking a function of the initialization interface.

9. The method of claim 7 wherein the assembly includes a connector provider interface for providing a reference to the instantiated connector.

10. The method of claim 9 wherein the instantiated connector has a name and wherein a function of the connector provider interface is passed the name and returns the reference to the instantiated connector.

11. The method of claim 7 wherein the assembling of the components is performed by executing pseudo-code.

12. The method of claim 7 wherein the assembling of the assembly into which an entity external to the assembly may be imported have a role.

13. The method of claim 7 whereby when the instantiated connector receives a reference to an entity external to the assembly that is being imported, the instantiated connector invokes a function of an identified component passing the received reference.

14. The method of claim 7 wherein an instantiated component is a sub-assembly.

15. The method of claim 7 wherein each component to be exported has an associated index for identifying the component.

16. A computer-readable medium containing instructions for causing a computer system to assemble components into an assembly, by:
    receiving a plurality of unaggregated components;
    providing a connector for exporting one or more of the components without aggregation and for importing an entity into a component of the assembly without aggregation; and
    identifying to the provided connector the one or more of the components that are to be exported and the component into which the entity external to the assembly is to be imported.

17. The computer-readable medium of claim 16 wherein the provided connector includes an initialization interface and the identifying includes invoking a function of the initialization interface.

18. The computer-readable medium of claim 16 wherein the assembly includes a connector provider interface for providing access to the provided connector.

19. The computer-readable medium of claim 18 wherein the provided connector has a name and wherein a function of the connector provider interface is passed the name and returns a reference to the provided connector.

20. The computer-readable medium of claim 16 wherein the assembling of the components is performed by executing pseudo-code.

21. The computer-readable medium of claim 16 wherein the components of the assembly into which an entity may be imported have a role.

22. The computer-readable medium of claim 16 whereby when the provided connector receives a reference to an entity that is being imported, the provided connector invokes a function of an identified component passing the received reference.

23. The computer-readable medium of claim 16 wherein a provided component is a sub-assembly.

24. The computer-readable medium of claim 16 wherein each component to be exported has an associated index for identifying the component.

25. A computer system for assembling components into an assembly, comprising:

a plurality of unaggregated components;

a connector for exporting one or more of the components without aggregation and for importing an entity external to the assembly into a component of the assembly without aggregation; and a mechanism that identifies to the connector the one or more of the components that are to be exported and the component into which the entity external to the assembly is to be imported.

26. The computer system of claim 25 wherein the connector includes an initialization interface and the identifying includes invoking a function of the initialization interface.

27. The computer system of claim 25 wherein the assembly includes a connector provider interface for providing a reference to the connector.

28. The computer system of claim 27 wherein the connector has a name and wherein a function of the connector provider interface is passed the name and returns a reference to the connector.

29. The computer system of claim 25 wherein the assembling of the components is performed by executing pseudo-code.

30. The computer system of claim 25 wherein the components of the assembly into which an entity external to the assembly may be imported have a role.

31. The computer system of claim 25 whereby when the connector receives a reference to an entity external to the assembly that is being imported, the connector invokes a function of an identified component passing the received reference.

32. The computer system of claim 25 wherein a component is a sub-assembly.

33. The computer system of claim 25 wherein each component to be exported has an associated index for identifying the component.

* * * * *

UNITED STATES PATENT AND TRADEMARK OFFICE
CERTIFICATE OF CORRECTION

PATENT NO.     : 6,256,780 B1                                                    Page 1 of 1
DATED          : July 3, 2001
INVENTOR(S)    : Antony S. Williams et al.

It is certified that error appears in the above-identified patent and that said Letters Patent is hereby corrected as shown below:

<u>Column 9,</u>
Line 6, after "connect" replace "(Unknown" with -- (IUnknown --.

<u>Column 11,</u>
Line 19, replace "delegates" with -- delegatee --.
Line 20, replace "delegates" with -- delegatee --.

<u>Column 12,</u>
Line 5, replace "101" with -- 1101 --.

<u>Columns 13 and 14, Table 1,</u>
Line 29, replace "uid" with -- guid --.
Line 32, replace "iConnectorProvider" with -- IConnectorProvider --.
Line 33, replace "QueryIntenface" with -- QueryInterface --.
Line 37, replace "uid" with -- guid --.

<u>Columns 15 and 16, Table 2,</u>
Line 2, replace "PSA1" with -- pSA1 --.

<u>Column 15,</u>
Line 67, after "in" insert -- one --.

<u>Column 18,</u>
Line 19, replace "assembling" with -- components --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,256,780 B1
DATED         : July 3, 2001
INVENTOR(S)   : Antony S. Williams et al.

It is certified that error appears in the above-identified patent and that said Letters Patent is hereby corrected as shown below:

<u>Columns 13 and 14,</u>
Table 1, at line 14, insert -- ] -- after "[<result-index>".

<u>Columns 15 and 16,</u>
Table 2, at lines 4, 7, 10 and 13, replace "Teplate" with -- Template --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,256,780 B1  Page 1 of 1
DATED        : July 3, 2001
INVENTOR(S)  : Antony S. Williams et al.

It is certified that error appears in the above-identified patent and that said Letters Patent is hereby corrected as shown below:

Column 18,
Line 19, replace "assembling" with -- components --.

Signed and Sealed this

Twenty-third Day of December, 2003

JAMES E. ROGAN
*Director of the United States Patent and Trademark Office*